United States Patent Office 3,159,498
Patented Dec. 1, 1964

3,159,498
DISPERSIBLE PIGMENTS
Stanley Myron Davis, Somerville, and Robert Glenn Fessler, Martinsville, N.J., and George Leathwhite Roberts, Jr., Lynchburg, Va., assignors to American Cyanamid Company, New York, N.Y., a corporation of Maine
No Drawing. Filed Dec. 28, 1960, Ser. No. 78,816
15 Claims. (Cl. 106—308)

This invention relates to a method of preparing readily dispersible pigments by freeze-drying pigment dispersions, thereby avoiding initial aggregation of the ultimates.

The technique of freeze drying sometimes referred to as lyophilization or drying by sublimation, has for some time been a fairly common method of drying biological materials. A rapid freezing followed by removal of water by sublimation at a temperature well below that of the freezing point of the system concerned has been used for the preservation of various micro-organisms as well as for the drying of very sensitive biological materials, including such sensitive materials as human blood serum, penicillin, and vaccines. The drying of blood serum and the drying of penicillin were practiced on a fairly large scale during World War II. Since that time, other biological materials have been frozen and dried while in the frozen state. In general, these are either materials which are completely water soluble, and which in the dried state are found to be readily redissolvable in water, or they are materials which are to be preserved intact in a particular form even when rewetted. Some food products have been frozen and dried, including coffee, pineapple juice, orange juice, and raw beef. Much early work on this subject is included in a text, "Freeze-Drying" (Drying by Sublimation), Earl W. Flosdorf, Reinhold Publishing Corporation, New York, 1949. Another publication, "Freezing and Drying," R. J. C. Harris, Editor, Hafner Publishing Co., Inc., New York, 1952, is based on a symposium in London in June of 1951. This publication describes certain apparatus and gives certain information on the freeze-drying of foodstuffs as well as biological materials. Such techniques as applied to biological materials are normally applied to materials having a comparatively high unit value where the cost of operation is not particularly critical. Much of the work in connection with the freeze-drying of foodstuffs is for the account of various military organizations, where again unique economic objectives are interposed.

It has now been found that by modifying these earlier freeze-drying techniques, it is possible to accomplish freeze-drying of pigments under such conditions as to give improved pigments at an economically competitive price.

Usually, the sterility of pigments is not a factor so that, accordingly, the aseptic techniques required for biological materials are not required in working with pigments. The omission of the sterile techniques markedly reduces the cost of operations.

Pigments, in general, are heat stable and are not subject to chemical decomposition at temperatures likely to be encountered in freeze-drying techniques. Generally, pigments are produced in larger quantities than biological materials, and accordingly it is desirable to be able to reduce the unit cost by increasing the size of the operating equipment.

Fortunately, the rate of freezing is not nearly as critical with pigments as with biological materials. A reasonably rapid freezing is preferred to avoid concentration of electrolytes and possible crystalline formation of ice in the material, as frozen, but a slower freezing cycle than with biologicals is adequate.

Because the pigments are heat stable, a much higher temperature and pressure can be used for their drying than can be used for biological products.

If local overheating occurs so that there is a meltback, part of the pigmentary properties are destroyed, or altered, but such an alteration is not dangerous as a similar defect could be with the biological products as it merely tends to reduce the value of the product, or its reliability, which is more readily picked up by inspection and corrected, without bodily harm to a user. Also, if a pigment batch is improperly dried, the pigment can be reconstituted and processed.

The freeze-drying technique is desirable because of its unique effects on the surface chemistry of pigments. E. K. Fischer and C. W. Jerome, Ind. Eng. Chem. 35, 336 (1943), state that the pigment-vehicle interface is the most important factor controlling the rheology of printing ink, and that rheology is the most significant property of printing inks. The surface chemistry and surface activity of the particles of the pigment for printing inks, paints, and other vehicles, is extremely important. It is normally desired that the pigment have as high a surface as is possible, and that the particles be comparatively small, usually less than 0.5 micron, although some azo and inorganic pigments may have particles as large as one micron. The surface area per unit of weight of pigments is relatively enormous; for instance, with a solid material of unit density which is 1 centimeter on a side for a small block, the surface area at unit density would be 6 square centimeters per gram. For pigments, the surface area can run up to value in the order of 10 square meters to several hundred square meters per gram. Accordingly, any energy values per unit of area are comparatively important in working with pigments.

Similarly, the effect of surface tensions of liquids becomes comparably enormous. The normal expression for the height of capillary rise is $$h_0 = \frac{2\gamma}{rgd}$$

where $\gamma$ is the surface tension in dynes/cm., $d$ is the density in grams per milliliter, and $g$ is the acceleration of gravity, and $r$ is the radius of the capillary in centimeters. For small tubes, for instance, in glass tubes having a 1 millimeter bore, a value of 20.9 centimeters is obtained for the capillary height of a water column. For fissures in a copper phthalocyanine pigment, for instance, where a fissure radius could be about 0.05 micron, and using the same equation, the value becomes 117,100 centimeters which is equal to a height of 3,845 feet, or 0.73 mile. In the conventional drying of a pigment, as the water is removed, the particles of the pigment would be pressed towards each other. This magnitude of pressure would tend to cause aggregation of the pigment particles.

Another method of calculating the energy available is to use the expression $$P = \frac{E}{r \cdot A}$$

where P equals pressure in dynes/cm.$^2$, E equals energy of the surface in ergs/cm., $r$ equals distance between particles, and A equals surface area/particle. When this is calculated for a copper phthalocyanine pigment with a surface area of about 80 square meters per gram, which gives an average particle diameter of about 0.05 micron, the pressure is found to be $1.2 \times 10^{13}$ dynes/cm.$^2$ or about 180 million pounds per square inch.

In conventional drying techniques, these forces are available to jam together particles of pigment, and when dried from an aqueous solution in which the water is removed in the liquid phase, the ultimate particles or "ultimates" are caused to adhere to each other, this being called aggregation. Considerable energy is required to again separate the ultimates and get the pigment in the finely-divided form which is desired. In contradistinction thereto, in freeze-drying techniques the water is not removed while in the liquid phase. Instead, a press cake or dispersion of pigment particles in water is frozen so that each individual pigment particle is separated from adjacent ones by water in the solid phase, called ice. The pigment particles are no longer mobile, but are locked in position. Hence, each pigment particle is kept separate by the ice and is removed by sublimation with each molecule of water coming from a solid surface. This reduces the chances for the pigment particles to come together or aggregate. Thus, there is no opportunity for the relatively enormous liquid-solid forces to come into play to have the effect of closing fissures in pigment particles or pulling the pigment particles towards each other so that they become close enough for the Van der Waals forces to be brought into play to cause the pigment particles to aggregate.

Because the pigment particles are never aggregated, there is no requirement for ball milling or roller milling, which is usually used to effect the major energy input required to effect efficient dispersion or to break up the aggregate to again yield the ultimates before the pigment is finally used.

Because there is no problem of chemical decomposition of the pigment particles, the temperature of the pigment-ice composition needs only be held low enough that the water remain in the solid phase as ice. If the aqueous phase is predominantly water and is free from electrolytes, a temperature of merely a few degrees below zero centigrated to insure that all particles and all portions of the surface are below zero centigrade is adequate. Hence, the very low temperatures which are required in the freeez-drying of biological materials are not necessary.

For pure water, the triple point, that is, the point at which water in the liquid phase, ice in the solid phase, and water in the vapor phase, can concurrently exist, is a pressure of 4.57 millimeters and a temperature of 0.008° C. If the partial pressure of water vapor is kept below 4 millimeters of mercury at all points of this system, for a pure water system, the water would sublime from the solid phase to the vapor phase without ever going through the liquid phase. This would leave a pressure differential of millimeters of mercury rather than microns as a presscure differential to be used as a driving force between the pigment being dried and the surface of the condenser on which the water is being condensed from the vapor phase as a solid phase, or as a driving force if an ejector-type pump is being used to remove the water from the system. In the drying of biologicals, the pressure on the system is frequently kept below 100 microns and efforts are made to have the pressure as low as 1 to 5 microns in order that the biological material may be kept at a minimum temperature, and a maximum driving force or pressure drop be available to cause the water molecules to sublime from the material being dried to the removal means.

By having a comparatively high allowable partial pressure of water, so that a pressure in the order of 3 or 4 millimeters in the vicinity of the pigment particles is all that is required, the condenser or ejector pump need not have the tremendous capacity required for biological drying, and by the same token small leaks are not as critical, and the cost of operation in general is markedly reduced because of the much smaller capacity of the pumping means. A comparatively high pressure of non-condensable gases may slow the rate of drying, but does not interfere with the drying. Non-condensable gases may be used as a sweep to remove water vapor from the surface of the ice. In the past, pigments have been synthesized in a liquid medium, or precipitated in a liquid medium, from which they are removed, as for example, by filtration, and air dried. When hot air is used for this drying, the heat input is sufficient to vaporize the liquid water but it also usually has a deleterious effect in causing the particles to sinter or aggregate. In the past, three methods have been used to reduce this aggregation tendency:

(1) The pigment is transferred directly from the liquid in which it was synthesized or conditioned to the final vehicle. This process is known as flushing, and there is no drying step. A pigment is flushed from a water to a solvent system without ever being dried. This flushing has disadvantages in that there is a requirement for a large inventory of pigments because the pigments may be flushed into many possible vehicles. For sales purposes, each pigment must be maintained in each of a group of vehicles, which presents a relatively enormous inventory problem, as well as storage and shipping problems. Additionally, many of the pigments do not develop their maximum color strength because of the difficulties of removing the last traces of the aqueous system.

(2) A second method has been azeotropic distillation. This comprises intimately mixing water-wet pigment with a water-immiscible organic liquid which is volatile under drying conditions, and by distilling off the water-immiscible organic liquid the water is removed from the system, leaving the pigment wet by the water-immiscible organic liquid, which may then be removed. This system permits the interchange of one solvent for another in which water is exchanged for the water-immiscible organic solvent, and there are two opportunities for aggregation, one during the transfer from the aqueous to the solvent phase, and the other during the removal of the solvent phase.

(3) The third approach has been to end treat the pigment with various types of surface-active agents before recovery so that the surface-active agent will change the surface-energy relationships of the pigment particles, and preferably by reducing the surface energy, prevent or reduce the tendency to aggregate.

In each of these methods, the treatments must be designed for specific types of vehicles, and in addition although improved over the untreated materials, the tinctorial strength and ease of dispersion still leave room for improvement.

In our new process, by trapping the pigment particles in the solid phase as the dispersion is frozen, there is no problem resulting from a liquid-pigment particle surface-energy relationship, because there is no liquid present. The suspending medium can then be totally removed by sublimation, and aggregation at this point is substantially prevented.

In biological systems, freeze-drying has largely been limited to water as a liquid phase.

In the present pigment drying systems, at least some of the liquid phase may be other than water. For example, the liquid phase may consist of pure water, or a mixture of water and an alcohol or water and acetone, or of water containing minor proportions of synthesis solvents such as trichlorobenzene, nitrobenzene, ortho-dichlorobenzene or other organic solvents. If the mixture of water and the solvent has a lower freezing point than that of water alone, the temperature of the subliming mass must be lower than that used when water alone is the liquid phase, and must in fact be sufficiently low that the solvent is maintained in the solid phase. While theoretically it is perfectly practical that the solvent system could contain such solvents as methyl or ethyl alcohol mixed with water, it is preferred that the solvent be comparatively free from the lower freezing solvents, such as the lower alcohols, or acetone, because the temperature at which these solvents in water freeze is lower than water alone; hence, if the final pigment product is obtained in a mixture of water and such solvents, it is convenient to filter out the pigment and redisperse in water alone. If the condenser and pump system is adequate to keep the solvent phase frozen solid, these lower boiling and lower freezing solvents may be present. These are completely water miscible. In synthesis systems where the pigment is produced in an organic solvent such as trichlorobenzene, small amounts of the trichlorobenzene are water soluble and are not deleterious. Even such solvents as methanol may be present in a small quantity without unduly reducing the melting point of the methanol water system. Accordingly, traces of such solvents, say of the order of 1% or less, may be present in the pigments when they are frozen for drying, without unduly reducing the temperatures required for effective operation. Thus, only minor precautions are required to reduce the concentration of low freezing and somewhat insoluble organic solvents in the aqueous phase before freezing for the drying step. This is highly advantageous because in many instances end treatment materials are added in solution in an organic solvent, or a small proportion of organic solvent is present from the original synthesis, and complete removal would be very troublesome.

Among the water miscible organic solvents which can be present, and either be removed by sublimation, or left on the pigment, are:

| | |
|---|---|
| Methanol | Diethyl amine |
| Ethanol | Acetamide |
| 1-propanol | Propionamide |
| Isopropanol | Phloroglucinol |
| Tetrahydropyran-2-methanol | Methyl Carbitol |
| | Butyl Carbitol |
| Acetaldehyde | Methoxytriglycol |
| Acetaldol acid | Ethoxytriglycol |
| Acetic acid | Ethylene glycol |
| Propionic acid | Diethylene glycol |
| Butyric acid | Triethylene glycol |
| Polyethylene glycol | Propylene glycol |
| Methyl Cellosolve acetate | Dipropylene glycol |
| Carbitol acetate | 1,5-pentanediol |
| 1,4-dioxane | 2-methyl-1,3-pentanediol |
| Diethyl Carbitol | 2,2-dimethyl-1,3-butanediol |
| Methyl Cellosolve | Hexylene glycol |
| Butyl Cellosolve | 1,2,6-hexanetriol |
| Dimethyl formamide | Acetone |
| Mono methyl formamide | Diacetone alcohol |
| Formamide | Methyl ethyl ketone |
| Ethylene diamine | β-Amino ethyl alcohol |
| Methyl amine | o-Amino phenol |
| Dimethyl amine | m-Amino phenol |
| Ethyl amine | |

An end treatment with respect to a pigment is a term used to refer to coating of the surface of the individual pigment particles with some material which has a desired effect on the surface chemistry of the pigment particles. Various forms of surface-active agents have a marked effect on the rheological properties of the pigment, in particular solvent systems. An end treatment may be used which gives a degree of hydrophobicity or hydrophilicity or a hydrophilic-organophilic balance which may be preferred for a particular end use. Among the populer agents used for end treatments are cationic, anionic, amphoteric, or nonionic surface-active agents, including such materials as stearic acid, abietic acid, or other rosin acids, or maleic acid-modified rosins, or their salts, and the like.

The surface-active agents in general are set forth in an article by John W. McCutcheon, "Synthetic Detergents and Emulsifiers—Up to Date III," Soap and Chemical Specialties, July, August, September and October 1955. Certain of these are herein later set forth by example.

Such materials may be added to an aqueous slurry containing the pigments which causes the surface-active agent to migrate to, and become fixed on, the surface of the pigment particles. After this is accomplished, the composition is frozen, and the solvents, predominantly water, and additionally such organic solvents as may remain as impurities from the synthesis or have been added with the desired end treating agent or otherwise are removed together in the drying step.

The present process may be used for a large variety of pigments; among the particularly useful pigments which can be sublimation dried are the phthalocyanines including particularly copper phthalocyanine, but additionally metal-free phthalocyanine, iron phthalocyanine, cobalt phthalocyanine, nickel phthalocyanine, zinc phthalocyanine, tin phthalocyanine, and their halogenated derivatives in which one or more of the hydrogen molecules on the phthalocyanine nucleus are replaced by such halogens as chlorine, bromine, iodine or fluorine. The replacement of part of the hydrogens by halogens changes the shade of the phthalocyanine. Similarly, different crystal forms, such as the red shade or the green shade copper phthalocyanines, may be used depending upon the color desired in the final product. Additionally, the phthalocyanine may have one or more substituents such as aminomethyl groups, or sulfonic groups, or carboxybenzamidomethyl groups to affect the color or characteristics of the pigment.

The freeze-drying treatment is satisfactory and gives preferred results whether the phthalocyanine has been synthesized in a particular solvent, which is diluted out with water, in the form of the press cake from the initial manufacturer, or whether the phthalocyanine has been produced as a dry solid, dissolved in an acid such as sulfuric acid, and then acid pasted by drowning in water to give finely-divided particles of phthalocyanine, which are separated as a press cake, again diluted with water after washing, frozen, and dried.

The phthalocyanines to be classed as useful pigments should have ultimates essentially of a size range below 0.5 micron, and below 0.1 micron is preferred. With other pigments, particularly titanium pigments and azo pigments, the particle size may be as large as one micron.

The present process is of value not only with the phthalocyanines, but with other pigments. Such pigments include the following:

| New C.I. Number | Name | Type |
|---|---|---|
| 42040 | Pigment Green 1 | Triphenyl methane. |
| 10020 | Pigment Green 12 | Naphthol. |
| 42000 | Pigment Green 4 | Triphenyl methane. |
| 77288 | Pigment Green 17 | Chromic oxide green. |
| 21090 | Benzidine Yellow | Dichlor benzidine Yellow. |
| 11680 | Pigment Yellow 1 | Hansa Yellow. |
| 12070 | Pigment Red 1 | Azo. |
| 12120 | Pigment Red 3 | Do. |
| 12085 | Pigment Red 4 | Chlorparanitraniline. |
| 15865 | Pigment Red 48 | Lithosol. |
| 15500 | Pigment Red 50 | Azo. |
| 15585 | Pigment Red 53 | Do. |
| 15880 | Pigment Red 63 | Do. |
| 58000 | Pigment Red 83 | Alizarine. |
| 42045 | Pigment Blue 9 | Triphenyl methane. |
| 69835 | Pigment Blue 21 | Indanthrone, chlorinated. |
| 77510 | Pigment Blue 27 | Prussian Blue. |
| 21010 | Pigment Brown 3 | Azo. |
| | Pigment Black | Manganese dioxide. |
| | Barium Chromate | |
| 74160 | Green Shade Copper Phthalocyanine. | |
| 74260 | Red Shade Copper Phthalocyanine. | |
| 42750 | Alkali blue (Acid Blue 110) | |
| | Titanium dioxide (rutile or anatase). | |

C.I. is the Colour Index (New), Second Edition (1956) by Society of Dyers and Colourists; and the American Association of Textile Chemists and Colorists, Lowell Tech. Inst., Lowell, Mass.

The new pigments produced by the freeze-drying process are not only more easily dispersible in water, or solvent systems, but are in general stronger than heat dried pigments otherwise the same. For example, a copper phthalocyanine can be shown to be 25% stronger when produced by freeze-drying rather than by heat-drying, when dispersed in lacquer or enamel. Additionally, far less energy is required for dispersion. Usually, simple stirring in a solvent system for 60 minutes will adequately disperse a frozen and dried pigment. A heat-dried pigment usually requires 24 hours in a ball mill to obtain maximum strength. Additionally, the mass-tone is glossier and free from haze, and is blacker and has greater print strength. The rheology is generally improved. The older heat-dried phthalocyanines, for example, are usually more thixotropic than frozen and dried phthalocyanines, which give a lower body to a printing ink or paint system, thus permitting greater strength and the use of less solvent and less ink.

In the surface coating field, as applied to pigments, a pigment is considered as water dispersible if maximum dispersion can be accomplished in an aqueous system, such as a latex paint, or aqueous flexographic ink. An oil dispersible pigment is one which can attain maximum dispersion, that is, be dispersed completely uniformly, in an oil system such as linseed oil, mineral oil, mineral spirits, trichlorobenzene, alkyd resins, nitrocellulose lacquers, or acrylic resins.

The present invention is comparatively broad, as is shown by the preceding general discussion, and the appended claims. All parts are by weight unless otherwise specified. As specific embodiments and illustrative of the present invention, certain specific examples are set forth:

EXAMPLE 1

Conventional Heat Drying

With most sublimation dried pigments, the standards of dispersibility and strength can best be rated by comparison with pigments produced by conventional techniques. As a conventional method of preparation, and a standard for comparison, red shade copper phthalocyanine is prepared as follows: 1 part of a crude green shade copper phthalocyanine, as a powder, is dissolved in 10 parts of 100% sulfuric acid. The mixture is stirred until the phthalocyanine is in solution, after which it is drowned in 100 parts of a 50% ice, 50% water mixture, additional ice being added if necessary to keep the mixture below 5° C. The copper phthalocyanine is precipitated as red shade crystals of pigmentary size—predominantly less than 0.1 micron.

The pigment is separated from the drowning bath by filtration, and washed with water until free from acid. The press cake contains 22.8% red shade copper phthalocyanine.

EXAMPLE 2

Heat Dried Pigment

One hundred grams of the press cake, prepared as above, is air dried in a constant temperature oven at 60° C. 22.8 grams of red shade copper phthalocyanine is obtained. The sample is crushed in a mortar with a pestle until the product passes through a 100-mesh screen. The thus recovered pigment has ultimate particles or ultimates of less than 0.1 micron, but has a number of aggregates in the range of from 50 to 100 microns which appear to have been formed by a sintering of the ultimates.

EXAMPLE 3

Freeze-Drying of Red Shade Copper Phthalocyanine

One hundred grams of the press cake prepared in accordance with Example 1 are placed in a 500 milliliter round bottom wide-necked flask equipped with a side arm. The flask is immersed in a bath containing Dry Ice in acetone. The sample is frozen solid in about 30 minutes. The flask is closed and attached, through a cold trap immersed in a Dry Ice and acetone mixture, to a vacuum pump which maintains a pressure of less than 1 millimeter of mercury. After evacuation, the flask is removed from the cold bath and exposed to room temperature. The sublimation of the ice removed heat from the copper phthalocyanine cake at such a rate that the cake containing ice remained frozen until nearly dry. After 20 hours, the sample had attained approximately room temperature and was free from water. 22.8 grams of finely-divided copper phthalocyanine of the red shade form is obtained.

Typical samples were tested and gave the following results:

| Type of Test | Product of Example 2 (Heat Dried) | Product of Example 3 (Dried by Sublimation) |
|---|---|---|
| Physical Appearance | Hard, granular powder, 1-10 mm. in diameter. | Fluffy, soft. |
| Tinctorial Strength (4 x 100) | 100% (standard) | 200%. |
| Strength Development | 40% | 100%. |
| Hegman Texture (1 x 100) | 0 | 5. |
| Hegman Texture (4 x 100) | 1 | 6.5. |

It is observed from the above data that the freeze-dried product is much more easily dispersed in the varnish than the heat-dried product, and:

(1) The tinctorial strength is doubled;
(2) Only one-quarter of the amount of mulling is required to double this strength; and
(3) The Hegman texture has increased about six-fold.

The tests are accomplished as follows:

A. Tinctorial strength: 0.5 gram of the dry copper phthalocyanine is mixed with 1 gram of No. 1 transparent lithographic varnish (a heat bodied linseed oil containing 0.135% cobalt drier). The pigment is incorporated into the lithographic varnish by mixing on a Hoover automatic muller for 4 sets of 100 revolutions, with 150 lb. pressure applied to the glass plates. At the end of the mulling, the base ink is removed, and 1 gram of the ink thus produced is mixed by hand with 10 grams of a white ink prepared by dispersing 70 grams of zinc oxide in 30 grams of the No. 1 lithographic varnish. This resultant pastel ink is used as a standard for comparing the tinctorial strengths. A trained eye, or a spectrophotometer may be used for the comparison.

B. Strength development test: In this test, 0.5 gram of the pigment is mixed with 1 gram of the No. 1 transparent lithographic varnish, and mulled for 1 set of 100 revolutions at 150 lbs. pressure. One gram of the ink is then mixed with 10 grams of the white ink, and used as a basis for comparison. The strength of the ink tinted in this fashion is compared with the control standard from Part A which was mulled 4 times at 100 revolutions. The more nearly the strength of the 1 x 100 sample approaches the strength of the 4 x 100 sample, the greater is the ease of dispersion. A numerical value which indicates the strength development or ease of dispersion is obtained by comparing the strength after 100 mulls with the strength after 400 mulls, and indicating the quotient as a percentage.

C. Hegman texture test: In this test, 1 gram of each of the base inks from Parts A and B above and 2 parts of the transparent lithographic varnish are mixed with a spatula until uniform. The texture of each is then measured by a Hegman gauge. The Hegman gauge is a trough of varying depth, from 0 to 4 mils (0.004 inch) depth. Each of the reduced inks is applied separately to the trough and blade is used to pull the ink completely over the trough. The appearance of particles on the surface of the ink makes it possible to determine when the particles are larger than the depth at which they are observed. This permits reading of the texture of the ink and a gradation from 0 to 8. The higher the reading the better the texture. For example, a reading of 7 indicates that all of the particles are smaller than 0.5 mil. It is desirable that the texture of the reduced ink that has been mulled 1 x 100 should approach the value of the reduced ink that has been mulled 4 x 100.

From these tests, it appears that the sublimation dried pigment should give excellent results with a minimum of dispersion energy in oil systems. Practical tests show the sublimation dried pigment to give good results, with a minimum of dispersion energy in each of lithographic varnish printing ink, alkyd enamel, nitrocellulose lacquer, and acrylic lacquer. Dispersibility even though good can be improved by an appropriate end treatment, as later described.

EXAMPLE 4

Freeze-Drying, Water Containing an Aqueous Miscible Solvent 100 parts of the copper phthalocyanine press cake prepared as in Example 1 were mixed with 262 parts of isopropyl alcohol, and 900 parts of water, by stirring in a high speed mixer for 50 minutes. 240 grams of this slurry were transferred to a 500 milliliter round bottom flask as described in Example 3, and the copper phthalocyanine pigment recovered by the same procedure described as in Example 3. The sublimation step was continued until the last traces of water and isopropanol were removed. No meltbacks were seen to occur in the product.

A fluffy, soft powder was obtained which, when evaluated, using the standard above mentioned, gave the following results:

| Type of Test | Product of Example 2 (Heat Dried) | Product of Example 4 (Recovered by freeze-drying of propanol water mixture) |
| --- | --- | --- |
| Physical Appearance | Hard, granular powder, 1-10 mm. in diameter. | Fluffy, soft powder. |
| Tinctorial Strength (4 x 100) | 100% | 200%. |
| Strength Development | 40% | 100%. |
| Hegman Texture (1 x 100) | 0 | 5½. |
| Hegman Texture (4 x 100) | 1 | 7. |

EXAMPLE 5

Hexadecachloro Copper Phthalocyanine 100 grams of the press cake from salt grinding hexadecachloro copper phthalocyanine were heat dried and used as a standard sample.

Freeze-Drying

A second duplicate 100 gram portion of the same hexadecachloro copper phthalocyanine press cake was frozen and dried by the procedure of Example 3.

The two pigments were evaluated by the process above described following Example 3. The results in particular samples were as follows:

| Type of Test | Heat-Dried | Frozen-Dried |
| --- | --- | --- |
| Physical Appearance | Hard, granular powder | Soft, fluffy powder |
| Tinctorial Strength (4 x 100) | 100%* | 115%. |
| Strength Development | 95% | 100%. |
| Hegman Texture (1 x 100) | 1.5 | 4.5. |
| Hegman Texture (4 x 100) | 3 | 6.5. |

*Used as a standard in this example.

The above test shows that the product recovered by freeze drying had a 15% superior strength, a greater rate of strength development, and a much greater freedom from particles, as is shown by the Hegman texture.

A salt ground product is normally regarded as one of the more readily dispersible because of the energy input during salt grinding.

EXAMPLE 6

N,N'-Di-(1,9-Anthraisothiazolone-2-Carboxy)-4,4'-Benzidine Sulfone 100 grams of press cake from the synthesis of N,N'-di-(1,9-anthraisothiazolone-2-carboxy)-4,4'-benzidine sulfone in an aqueous medium was separated out and dried at 60° C. for 24 hours. This was used as a heat-dried sample.

Frozen-Dried Sample

A duplicate 100 gram portion of the same press cake was dried by the process of Example 3 by freezing and subliming water from the frozen press cake. The two products, one heat-dried and the other frozen-dried, were evaluated for strength and texture by the procedures above indicated. The following results were obtained:

| Type of Test | Heat-Dried | Frozen-Dried |
| --- | --- | --- |
| Physical Appearance | Very hard granular 1-5 mm. in diameter. | Soft, fluffy powder. |
| Tinctorial Strength (4 x 100) | 100%* | 400%. |
| Strength Development | 20% | 60%. |
| Hegman Texture (1 x 100) | 0 | 1.5. |
| Hegman Texture (4 x 100) | 0 | 3.5. |

*Used as a standard.

The improvements in tinctorial strength, strength development, and texture are particularly marked.

EXAMPLE 7

N,N'-Di-(2,3-Phthaloyl Pyrrocoline-1-Carbonyl)-3,3'-Dichloro-4,4'-Benzidine Sulfone 100 grams of press cake containing N,N'-di-(2,3-phthaloyl pyrrocoline-1-carbonyl)-3,3'-dichloro-4,4'-benzidine sulfone, as separated from an aqueous synthesis medium, were heat dried by following the procedure of Example 2.

A second 100 gram portion of the identical press cake was isolated by the procedure of Example 3, a freeze-drying technique. Pigments thus obtained were evaluated with the following results:

| Type of Test | Heat-Dried | Freeze-Dried |
| --- | --- | --- |
| Physical Appearance | Very hard granular powder, 1-5 mm. in diameter. | Soft, fluffy powder. |
| Tinctorial Strength (4 x 100) | 100%* | 133%. |
| Strength Development | 50% | 70%. |
| Hegman Texture (1 x 100) | 2 | 5. |
| Hegman Texture (4 x 100) | 4 | 6.5. |

*Used as standard.

EXAMPLE 8

Acid Blue 110 (New Color Index No. 42750)

A press cake from the synthesis in an aqueous medium of Acid Blue 110 was treated as above described in Examples 2 and 3. One portion of 100 grams was heat dried. A second portion of 100 grams of the same press cake was mixed with 200 parts of isopropyl alcohol, after which the pigment was recovered using the procedure of Example 3, with the temperature low enough to keep the cake frozen. A third portion of the press cake was frozen and dried and the pigment recovered from water only. The following results were obtained on evaluation:

| Type of Test | Heat Dried | Frozen and Dried (water only) | Frozen and Dried after adding isopropanol |
| --- | --- | --- | --- |
| Physical Appearance | Hard lumps | Soft, fluffy powder. | Soft, fluffy powder. |
| Tinctorial Strength | 100% | 125% | 125%. |
| Strength Development | 65% | 98% | 95%. |
| Hegman Texture (1 x 100) | 2 | 6 | 3.5. |
| Hegman Texture (4 x 100) | 4.5 | 7 | 5.5. |

Similar results were obtained in recovering press cakes of the following pigments:

(1) Dinitro dibenzanthrone
(2) Oxynitro dibenzanthrone
(3) 1,4-dibenzoylamino anthraquinone
(4) Vat Green 9—New C.I. No. 59850
(5) Vat Blue 4—New C.I. No. 69800
(6) Vat Blue 6—New C.I. No. 69825
(7) Pigment Blue 21—New C.I. No. 69835
(8) Vat Violet 17—New C.I. No. 63365
(9) Vat Green 1—New C.I. No. 59825
(10) Lithol Red
(11) Toluidine Red
(12) Dichlorobenzidine Yellow Among the solvents which can be present in small proportions are ethylene glycol, 2-ethyoxyethanol, acetone, dimethyl formamide, etc., including the solvents above-recited.

EXAMPLE 9

100 grams of copper phthalocyanine press cake, as prepared in Example 1, was mixed with 20 grams of toluene and 20 grams of water. After slurrying, the mixture was heat dried at 60° C. in air, as set forth in Example 2.

A similar sample of 100 grams of copper phthalocyanine press cake, also mixed with 20 grams of toluene and 20 grams of water, was frozen and the solvents sublimed using the procedure set forth in Example 3.

Pigments thus produced were evaluated with the following results:

| Type of Test | Heat-Dried | Frozen-Dried |
| --- | --- | --- |
| Physical Appearance | Soft powder | Soft, fluffy powder. |
| Tinctorial Strength (4 x 100) | 100%* | 190%. |
| Strength Development | 85% | 95%. |
| Hegman Texture (1 x 100) | 5.5 | 5.5. |
| Hegman Texture (4 x 100) | 7.0 | 7.0. |

*Used as the control standard.

EXAMPLE 10

Titanium Dioxide Pigment 100 parts of rutile titanium dioxide press cake containing 55% titanium dioxide from slurrying in water the calcined hydrate of titanium dioxide obtained in the manufacture of titanium dioxide, were dried in air at 60° C.

A second portion of the same press cake was dried by first freezing and then subliming in accordance with the procedure of Example 3.

Samples were evaluated by incorporating into a standard synthetic automotive alkyl melamine enamel by ball milling with an enamel having the following composition:

|  | Parts |
| --- | --- |
| Rezyl® 387-5 [1] | 41.0 |
| Cymel® 247-10 [2] | 6.73 |
| Xylene | 12.37 |
| Butanol | 7.60 |
| Total | 67.70 |
|  | [3] 32.30 |
| Total | 100.00 |

[1] An alkyd-type resin containing about 55% resin solids in xylol, the resin being a glycerol-phthalic anhydride type and containing at least 41% phthalic anhydride and having an acid number of 4-10.
[2] Cymel® 247-10 is an alkylated melamine formaldehyde resin (60 parts) in 40 parts butanol.
[3] Parts of the TiO₂ from above.

The results obtained were as follows:

| Type of Test | Titanium Dioxide Heat-Dried | Titanium Dioxide Frozen-Dried |
| --- | --- | --- |
| Tinctorial Strength (milled 10 hours) | 100% [1] | 98%. [2] |
| Hegman Texture (milled 2 hours) | 3 | 3.5. |
| Hegman Texture (milled 5 hours) | 4 | 7. |
| Hegman Texture (milled 10 hours) | 7 | 7. |

[1] Used as standard at 100%.
[2] The maximum strength was developed after 5-hour milling, not 10 hours.

It appears that the product obtained by freeze-drying developed full texture and maximum tinctorial strength after 5 hours of ball milling, which is one-half of the time required for the heat-dried product.

EXAMPLE 11

Copper Phthalocyanine With End Treatments

The effect of the surface-active agents on the dispersibility of pigments is considerable. The addition of such an agent to the surface of the pigment particles is called end treatment. Even though the surface-active agents have a marked influence, where other conditions are constant, the freezing and drying of the pigment gives a stronger pigment than if heat drying is used.

100 parts of press cake prepared in accordance with Example 1 were mixed with a spatula in a beaker with a surface-active agent until the press cake was deflocculated, as was indicated by fluidization. The resultant product was split into two parts. One part was recovered by drying at 60° C. using the process of Example 2. The other was frozen and the water sublimed under high vacuum at a total pressure of less than 100 microns of mercury. The pigments were evaluated by stirring a portion of the recovered pigment into a white latex paint containing 27% titanium dioxide at a ratio of 1 part of pigment to 20 parts of titanium dioxide. The stirring was carried out for 10 minutes at 1600 r.p.m. with a propeller type mixer. The strength was compared on a recording visual spectrophotometer. As a nonionic hydrophilic agent, the condensation product of nonyl phenol and 8 moles of ethylene oxide was used. This product is available commercially as Igepal CTA-639. As an anionic agent, the ammonium salt of the sulfated ester of the same material was used. This is available commercially as Alipal CO—436. The following results were obtained:

| Agent | Weight Percent of Agent Based on Pigment | Tinctorial Strength | |
| --- | --- | --- | --- |
| | | Heat-Dried, Percent | Freeze-Dried, Percent |
| None | | 1 | 1 |
| CO-436 | 5 | [1] 60 | [2] 100 |
| CO-436 | 10 | [1] 100 | 180 |
| CO-436 | 15 | [1] 165 | 214 |
| CO-436 | 20 | [1] 258 | 273 |
| CTA-639 | 5 | [1] 65 | 134 |
| CTA-639 | 10 | [1] 110 | 231 |
| CTA-639 | 15 | [1] 162 | 233 |
| CTA-639 | 20 | [1] 228 | 235 |
| CTA-639 | 30 | [1] 230 | 240 |
| (CO-436) & (CTA-639) | 10 & 10 (Total 20%) | [1] 270 | 287 |

[1] Streaks present due to poor dispersion in every sample which was isolated by heat-drying.
[2] Used as standard because untreated hydrophobic pigment will not stir in.

It is noted that the frozen-dried material is used as a standard in this table because the material dispersed well and stirred in well.

Other nonionic surface-active agents which give good results include the condensation product of nonyl alcohol with 10-, 15- or 30-moles of ethylene oxide. Other alkyl aryl polyether alcohols containing from 4 to 12 carbon atoms in the alkyl group and about 4 to about 20 moles of ethylene oxide are suitable. The polyethylene glycol thioethers reacted with various phenols having alkyl groups of from 8 to 13 carbon atoms attached to the phenyl ring are very satisfactory. The ethylene oxide condensates with polyoxypropylene work very well.

Among the anionic agents which may be used are the alkyl sulfonates or alkyl aryl sulfonates which combine sulfonic acid derivatives of aromatic compounds with long chain aliphatic radicals attached to the aromatic rings.

Similar improved results are obtained with 10% of the nonionic agent obtained by condensing 6 moles of ethylene oxide with 1 mole of octyl phenol and the anionic agent isopropyl naphthalene sodium sulfonate. Among the pigments, the dispersibility of which is improved, are hexadecachloro copper phthalocyanine, metal-free copper phthalocyanine, when end treated with the above agents, as well as others.

EXAMPLE 12

Part I.—10% Calcium Rosinate 100 parts of press cake from Example 1 containing 22.8 parts of real copper phthalocyanine was dispersed in 2,270 parts of 10% aqueous sulfuric acid in an agitated tank. The stirring was continued for 1 hour until the lumps of press cake were broken. The slurry was heated to 80° C. at the rate of 1½ to 2° C. per minute and held at 80° C. with stirring for 2 hours.

4 parts of sodium hydroxide pellets were dissolved in 50 parts of water at 60° C. The solution was agitated, and to the agitated solution was added 30 parts of abietic acid, with stirring. The slurry was heated to 80° C., until the abietic acid was completely dissolved.

8.8 parts of this sodium abietate solution were added to the pigment slurry from 100 parts of press cake (above mentioned) and stirring continued for 1 hour. 3.29 parts of anhydrous calcium chloride were dissolved in 25 parts of water, and added over a period of 5 minutes to the slurry. The pigment slurry was again stirred at 80° C. for 1 hour, after which the slurry was filtered and washed with 5 liters of water at 60° C. The resultant press cake was divided into 2 portions, one of which was dried at 60° C. in an atmospheric oven, and the other portion was dried by freezing and subliming from the frozen state. These samples were designated Part I.

Part II.—15% Calcium Rosinate

The procedure, as above, was followed except that 13.2 parts of sodium abietate solution and 4.98 parts of calcium chloride were used, giving a total of 15% treating agent, based on the weight of the pigment.

Part III.—Calcium Oleyl Sarcosinate 100 parts of the press cake used in the above Part I were dispersed in 2,270 parts of 10% sodium hydroxide, by stirring with a paddle for 1 hour, and then heating to 80° C. at about 2° per minute, and holding at 80° C. for 2 hours. 2.8 parts of N-oleyl-N-methyl amino acetic acid was dispersed in 25 parts of water and the resultant dispersion was added to the alkaline pigment slurry at 80° C. Stirring was continued for 1 hour, then 2.25 parts of anhydrous calcium chloride dissolved in 50 parts of water were added over 5 minutes with stirring, at 80° C. Stirring was continued for 1 hour and the slurry was filtered and washed alkaline free. The press cake was split into 2 parts, one of which was frozen and dried, and one of which was heat dried.

Part IV.—Nonyl Phenoxyethoxyethanol 100 parts of press cake from Example 1 was placed in a beaker to which was added 2.3 parts of nonyl phenol condensed with 2.5 moles of ethylene oxide per mole of nonyl phenol. The resultant paste was stirred mechanically with an agitator at 2,000 r.p.m., while 66 parts of water were added to cause the mixture to become fluid. The resultant slurry was split into 2 parts, one of which was heat dried, and the other of which was frozen dried.

Part V.—Sodium Abietate—10%

100 parts of the copper phthalocyanine press cake from Example 1 was treated in a beaker by adding 8.8 parts of sodium abietate solution prepared as in Part I of this example. 66 parts of water were added to cause the mixture to become a thinner fluid, and the subsequent press cake after filtration and washing was divided into 2 portions, one of which was isolated, one by heating and drying, and the other by freezing and drying.

Part VI.—Dodecyl Trimethyl Ammonium Chloride—20%

100 parts of the press cake from Example 1 in a beaker were treated with 9.12 parts of a 50% solution of dodecyl trimethyl ammonium chloride in isopropanol. After the product had been stirred to form a uniform dispersion, the suspension was filtered and washed, split into two parts, one of which was heat dried, and the other dried by sublimation. The results of the above 6 parts are summarized in the following table:

| Hydrophobic End-Treatments for Copper Phthalocyanine Example | | Percent Agent Based o.w.p. | Tinctorial Strength | | Texture 1 x 100 | | Texture 4 x 100 | | Strength Development | |
|---|---|---|---|---|---|---|---|---|---|---|
| Part | Agent | | H-D | F-D | H-D | F-D | H-D | F-D | H-D | F-D |
| | None | 0 | *100 | 200 | 0 | 1 | 5 | 6½ | 40 | 100 |
| I | Calcium Rosinate | 10 | 200 | 202 | 1½ | 5 | 6½ | 7 | 95 | 100 |
| II | Calcium Rosinate | 15 | 195 | 201 | 1½ | 5½ | 6½ | 8 | 95 | 100 |
| III | Calcium Oleyl Sarcosinate | 10 | 200 | 203 | 1½ | 6 | 6 | 7½ | 94 | 100 |
| IV | Nonyl phenoxy polyoxyethylene ethanol | 10 | 183 | 185 | 5 | 5 | 6 | 6 | 95 | 99 |
| V | Sodium abietate | 10 | 190 | 197 | 1½ | 6½ | 6 | 7 | 95 | 100 |
| VI | Dodecyl trimethyl ammonium chloride | 20 | 185 | 200 | 0 | 3½ | 7 | 7 | 40 | 100 |

*Value of 100% used as standard for all examples.
H-D=Particle-ultimates recovered by heating at 60° C. until dry.
F-D=Particle-ultimates recovered by sublimation until dry.
O.W.P.=Based on weight of pigment.

Other metals such as strontium, magnesium, barium and aluminum may be substituted for the calcium in Parts I, II or III, with comparable improved results. Similarly, salts other than the chloride, which are soluble, may be used. Calcium chloride is normally used commercially because it is very cheap and very available. Specific data on each is analogous and would unduly lengthen this disclosure.

EXAMPLE 13

One of the most critical tests of pigment dispersibility is to stir the pigment directly into a paint vehicle without the use of large amounts of energy such as normally is imparted to the system in commercial ball milling. The pigments prepared in Example 12 were incorporated directly into a paint vehicle using only simple agitation. To determine the effectiveness of the dispersion, the strength of a commercial pigment ball milled in the conventional manner (16 hours) was used as a standard. The strength of this standard was set at 100% and all subsequent values obtained in this example were compared against this standard.

The pigments prepared in the preceding example were used in this test. A composite automotive lacquer vehicle was prepared by mixing the ingredients shown in the following table.

Composite vehicle: Parts
Rezyl® 99-4-60 [1] _____ 24.00
Toluene _____ 11.55
Ethyl acetate _____ 5.70
Melmac® 245-8 [2] _____ 3.30
Castor oil No. 3 _____ 1.60
Dibutyl phthalate _____ 3.30
Lacquer base (nitrocotton) _____ 11.25
Butanol _____ 3.85
Butyl acetate _____ 9.59
Ethyl acetate _____ 14.07
Ethanol _____ 6.74
        Total _____ 94.95

[1] Rezyl® 99-4-60 is a short oil non-oxidizing alkyd resin at 60% resin solids in toluene. The solids result from the reaction of phthalic anhydride 43%, and 34% oil acids minimum, and has an acid number of 4 to 8.
[2] Melmac® 245-8 is butylated melamine formaldehyde resin at 50% solids in a mixture of butanol and xylol.

In 94.95 grams of this vehicle, 5.05 grams of each pigment solids was stirred at 1,600 r.p.m. in a 16-oz. jar using a 1-inch propeller for 10 minutes. 1.0 g. of the highly colored paste lacquer was reduced with 19.0 grams of the standard vehicle lacquer of the composition shown in the following table:

| | Parts |
|---|---|
| White pigment | 12.0 |
| Rezyl 99-4-60 | 21.4 |
| Toluene | 12.9 |
| Melmac 245-8 | 2.56 |
| Castor oil | 1.54 |
| Dibutyl phthalate | 2.56 |
| Nitrocotton (½ sec.) | 10.36 |
| Ethanol | 6.22 |
| Ethyl acetate | 17.05 |
| Butanol | 3.77 |
| Butyl acetate | 9.64 |

A drawdown of the tinted lacquer was made on a Morest card No. O7P using a drawdown blade with 0.005" clearance. The lacquer film was air dried and the strength of the samples compared on a recording spectrophotometer at the wavelength of maximum absorption (610 microns).

The standard sample by conventional ball milling technique was as follows:

5.05 g. pigment solids heat dried by the procedure of Example 1, was added to 94.95 g. of the composite vehicle in a quart jar half filled with ¼" steel balls. The jar was placed on rollers and rolled at 60 r.p.m. for 16 hours. One gram of this highly colored base lacquer was reduced with 19 grams of a white lacquer of the composition shown above. The drawdown was made on a Morest card as in the above examples with a blade having 0.005" clearance. The films were air dried and the strength measured using the same recording spectrophotometer. The results are listed in the following table:

*Stir in Tests*
COPPER PHTHALOCYANINE

| Prep. of Example | Agent | Percent Agent, o.w.p. | Heat Dried,[1] percent | Freeze Dried,[2] percent |
|---|---|---|---|---|
| Ball milled to disperse. | None | 0 | 100 | |
| Stirred in | do | 0 | ~24 | 75 |
| 13-I (stirred in) | Calcium Rosinate | 10 | ~6 | 124 |
| 13-II (stirred in) | do | 15 | ~25 | 114 |
| 13-III (stirred in) | Calcium Oleyl Sarcosinate. | 10 | ~25 | 95 |
| 13-IV (stirred in) | Nonyl Phenoxy Polyoxyethylene Ethanol. | 10 | ~25 | 95 |
| 13-V (stirred in) | Sodium Abietate | 10 | ~25 | 114 |
| 13-VI (stirred in) | Dodecyl Trimethyl Ammonium Chloride. | 20 | ~25 | 105 |

[1] Particle-ultimates recovered by heating at 60° C. until dry, as above
[2] Particle-ultimates recovered by sublimation, as above.
~Means about—at such low values, results are approximate.

Other agents which may be used for treatment of any of the pigments described in the above examples, include the following.

A. Cationic agents:
(1) Stearamido propyl, dimethyl, beta-hydroxyethyl ammonium chloride.
(2) Ethanolated alkyl guanidine amines.
(3) Substituted oxazalines.
(4)
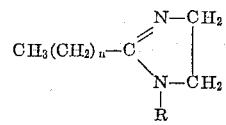

where R=lauryl, oleic or stearic acid residues.
(5) Alkyl dimethyl amine oxides.
(6) Cetyl, dimethyl, benzyl ammonium chloride or bromide or cetyl trimethyl ammonium bromide.
(7) Acetic acid salts of n-alkyl amines with 8, 10, 12, 16 or 18 carbons in alkyl group.
(8) Primary amines of 8, 10, 12, 16 or 18 carbon atoms.
(9) Di-n-alkyl amines.
(10) Alkyl, trimethyl ammonium chlorides of 8, 10, 12, 16 or 18 carbon atoms, also di-n-alkyl dimethyl ammonium chlorides.
(11) Cetyl, trimethyl ammonium stearate.
(12) Alkyl, dimethyl, dichlorobenzoyl ammonium chloride.
(13) Lauryl isoquinolinium bromide.
(14) Alkyl polyoxy ethylene glycol amines.
(15) Alkylol amides.
(16) Diamine fatty acid condensates.
(17) Amine esters of long chain fatty acids.
(18) Lauric amido amine.
(19) Oleic amido amine.
(20) Alkenyl dimethyl ethyl ammonium bromide.
(21) Alkyl, dimethyl, hydroxy-ethyl ammonium chloride.
(22) Alkyl biguanidine.
(23) Stearyl, dimethyl, benzyl ammonium chloride.

(24)
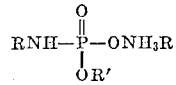

where R is $C_{12}H_{25}$ and R' is a water-solubilizing group.
(25) Cetyl pyridinium chloride.

B. Amphoteric hydrophobic agents:
(1) Complex fatty amido compounds.
(2) Carboxy ethyl amine derivative.
(3) Mixture of lauryl and myristyl esters containing primary amines and sulfate groups.

(4)
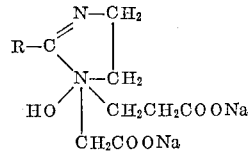

R from coconut oil acid, capric, caproic, myristic, stearic, or linseed oil acid.
(5) N-methyl taurine.
(6) Cetyl betaine.
(7) Long chain betaine.
(8) Complex fatty amido compound.
(9) N-coco-beta-amino butyric acid.

C. Nonionic hydrophobic agents:
(1) Aliphatic alcohols C8 to C30.
(2) Aliphatic ketones C8 to C30.
(3) Aromatic or alkyl aryl alcohols or ketones as above.
(4) Esters of long chain fatty acids, C12 to C30.
(5) Esters of poly alcohols or polyethylene oxide compounds where the amount of ethylene oxide is less than 4 moles per mole of alcohol.

(6) Sugar type compounds such as Sorbitol or Sucrose which have been esterified.

(7) Fatty amides or N-substituted fatty amides having C12 to C30.

D. Anionic agents: Materials such as insoluble salts of fatty acids (C greater than 12), the fatty acids themselves, and alkyl aryl fatty acids. Also such materials as metallic naphthenates, metallic rosinates and stearyl sulfonate metal salts.

In general, the end treatments with anionic agents or nonionic agents having a higher ethylene oxide content, and their mixtures, give pigments which are easily dispersible in a water base or latex system. The cationic agents and amphoteric agents, particularly those with the lower ethylene oxide contents, are more readily oil dispersible. The agents chosen, or their mixtures, are selected to be most readily dispersible in the system of choice, as the hydrophobic-hydrophilic balance of each carrier varies, and the end treatment can be selected for best results in a chosen system. The choice of agent is in accordance with conventional practice. The sublimation drying improves the ease of dispersion.

EXAMPLE 14

100 grams of the copper phthalocyanine press cake from acid pasting described in Example 1 and containing 22.8 grams of real copper phthalocyanine was dispersed in 228 parts by weight of water and 228 parts by weight of isopropanol and heated to 60° C. with stirring and held at 60° C. for 2 hours while stirring. 8.8 milliliters of sodium abietate solution prepared as in the second part of Example 12 were added to the slurry at 60° C. 3.9 grams of anhydrous calcium chloride dissolved in 25 milliliters of water was added, with stirring, to the slurry over a 5-minute period. The stirring was continued at 60° C. for another hour, when the slurry was cooled, and split into 2 parts. The first part was recovered by heat drying at 60° C.; the second part was placed in a tray which was placed on a plate of a freeze drying oven. The oven was closed and the temperature within the oven was reduced to −50° C. until the slurry was frozen solid. The pressure was reduced to 100 microns mercury pressure and heat was gradually applied to the plate in the oven on which the tray was resting to cause the water and isopropyl alcohol to sublime from the slurry. The pigments obtained were tested as above, and the following results were obtained:

| Tinctorial Strength, percent | | Texture 1 x 100 | | Texture 4 x 100 | | Strength Development, percent | |
|---|---|---|---|---|---|---|---|
| H-D | F-D | H-D | F-D | H-D | F-D | G-D | F-D |
| 190 | 198 | 1½ | 5½ | 6½ | 7 | 94 | 99 |

Similar results are obtained when the abietate is added as the free acid, or the potassium or lithium, or ammonium salt.

EXAMPLE 15

100 grams of copper phthalocyanine press cake as prepared in Example 1 was mixed with 2.28 grams of the condensation product of 3 moles of ethylene oxide with 1 mole of nonyl phenol dissolved in 75 grams of toluene. The slurry was mixed at room temperature for 1 hour, and divided into 2 parts. One part was recovered by heating in an atmospheric oven at 60° until dry. The second part was placed in a tray, which was placed on a plate in a freeze-drying oven. The temperature of the plate in the oven was reduced until the slurry froze, after which the pressure in the oven was reduced to about 300 microns of mercury, after which heat was applied through the plate to the tray containing the slurry, so that the frozen mixture which would be sublimed with the toluene and water subliming off. A steam jet pump was used to maintain the vacuum.

An evaluation of the two products showed the following results:

| Test | Heat-Dried | Freeze-Dried |
|---|---|---|
| Physical Appearance | Medium hard powder. | Soft, fluffy powder. |
| Tinctorial Strength (4X100) | 100% | 195%. |
| Strength Development | 85% | 95%. |
| Hegman Texture (1X100) | 5% | 5½. |
| Hegman Texture (4X100) | 7 | 7. |

As the above examples are by way of illustration only, it is to be understood that the variation in pigments and end treating agents can be quite broad.

The freeze drying treatment for laboratory size samples is most conveniently accomplished by freezing the pigment aqueous slurry in a glass vial or test tube, after which the vial or test tube is attached to a vacuum pump, and allowed to warm up. A plurality of various samples may be attached to standard freeze drying pigs. Where organic solvents are present, the temperature of the condenser may have to be lower than if water alone is present, depending upon the particular solvent which is additionally present.

For a large scale operation, it is much more convenient to pour the slurry in pans or trays. These trays may be from a depth of ¼-inch or less up to one inch or two. The trays are placed on the shelves of freeze drying ovens and refrigerant circulated through the shelves until the temperature of the slurry in the trays is reduced sufficiently to freeze the slurry. The ovens are then evacuated, using either a condenser or a jet to maintain a low vacuum to remove the water vapor or water and solvent vapor. The conventional freeze drying techniques of partially reducing the pressure as the slurry freezes may be used to avoid the entrapment of air which would have the dual disadvantages of increasing the noncondensable gas load on the pumping system, and tending to blow the pigment away as various air pockets were released. By partially reducing the pressure as the material freezes, non-condensable gases tend to be evolved from the system while still in the liquid state. It is, of course, possible to freeze the slurry by reduction in pressure alone without any refrigeration. By spraying or otherwise agitating the mixture, the pigment and water, or pigment and water-solvent system is chilled by evaporative cooling until discrete particles of the frozen material are formed, which allows a greater access to the surface of the frozen material. For even larger scale operations, it is convenient to use drum-type freezers in which the slurry is frozen as a thin layer on the inner or outer surface of a rotating drum, from which it may be scraped as a snow-like composition which has a comparatively large surface to volume ratio. If the material is kept in a drum which is rotated, the heat transfer from the walls of the drum to the frozen composition is increased. As is well recognized, sublimation requires large quantities of heat, and for fastest processing it is necessary that this heat be supplied at such a rate that the frozen composition is warmed as much as is feasible without overloading the condensing system and permitting part of the material to melt. With very large pumping systems, a comparatively high rate of heat input is preferred. With pumping systems of lower capacity, the normal transfer from the ambient air supplies sufficient heat to accomplish the objectives.

Because the pigments are comparatively stable to heat, and the only problem is to avoid having the solvent present in a liquid phase, the temperature of sublimation can be much higher than is normally used with biologicals or foodstuffs. By the same token, this higher temperature permits a higher pressure in the drying operation. A pressure of as much as 2 to 3 millimeters in the drying oven is not deleterious if comparatively uniform heat transfer and temperature conditions are attained. With such a comparatively high pressure, the use of a steam ejector as a pumping device becomes more practical. Similarly, a condenser-type pumping device need not have nearly as large capacity, nor operate at as low a temperature as is required for freeze drying with labile biologics which frequently must be maintained at pressures in the range of less than 10 microns for preferred drying conditions.

All parts herein are by weight unless otherwise specified.

Having described certain embodiments of the invention, our invention is set forth in the accompanying claims in which we claim:

1. A method of preparing copper phthalocyanine, oil-dispersible, stir-in, red-shade form, pigment comprising: drowning a sulfuric acid solution of copper phthalocyanine in water, separating the particles of copper phthalocyanine in pigmentary form having an average particle size of less than about 0.5 micron, washing the pigment particles free from acid, and without drying, redispersing the still water-wet press cake in water, adding a solution of sodium abietate, then adding a soluble heavy metal salt, with agitation, thereby forming an insoluble heavy metal abietate on the surface of the individual pigment particles, freezing the pigment dispersion to solid form, and subliming the water from the pigment particles, whereby the pigment particles are held without aggregation, locked in the ice during the drying step, and are therefore readily dispersible.

2. A method of preparing a phthalocyanine, oil-dispersible, stir-in, pigment comprising: drowning a sulfuric acid solution of a phthalocyanine in water, separating the particles of phthalocyanine in pigmentary form having an average particle size of less than about 0.5 micron, washing the pigment particles free from acid, redispersing the water-wet press cake in water, adding a solution of a soluble abietate, then adding a soluble heavy metal salt, with agitation, thereby forming an insoluble heavy metal abietate on the surface of the individual pigment particles, freezing the pigment dispersion to solid form, and subliming the water from the pigment particles.

3. A method of preparing a phthalocyanine, oil-dispersible, stir-in pigment comprising: drowning a sulfuric acid solution of a phthalocyanine, selected from the group consisting of copper phthalocyanine, unmetallized phthalocyanine, cobalt phthalocyanine, tin phthalocyanine, zinc phthalocyanine, and halogen, sulfonic, imidomethyl, and phthalimido derivatives thereof, in water; separating the particles of said phthalocyanine in pigmentary form having an average particle size of less than about 0.5 micron; washing the pigment particles free from acid; redispersing the water-wet press cake in water; adding a solution of a surface-active acid selected from the group consisting of abietic acid, naphthenic acid, rosin acid, and fatty acid having from 12 to 24 carbon atoms, as a compound with a cation selected from the group consisting of the cations of hydrogen, sodium, potassium, lithium, and ammonia; then adding, with agitation, a soluble heavy metal salt selected from the group consisting of the water-soluble salts of calcium, strontium, magnesium, aluminum, and barium, thereby forming an insoluble heavy metal surface-active acid salt on the surface of the individual pigment particles, freezing the pigment dispersion to solid form, and subliming the water from the pigment particles.

4. A method of preparing a phthalocyanine, oil-dispersible, stir-in, pigment comprising: drowning a sulfuric acid solution of a phthalocyanine, in water; separating the particles of said phthalocyanine in pigmentary form having an average particle size of less than about 0.5 micron; washing the pigment particles free from acid; redispersing the water-wet press cake in water; adding a solution of a surface-active agent, whereby the agent is adsorbed on the surface of the individual pigment particles, freezing the pigment dispersion to solid form, and subliming the water from the pigment particles.

5. A method of preparing a pigment, the individual ultimates of which are substantially free from aggregation and tendency to flocculate and which is readily dispersible by stirring in an individual liquid selected from the group consisting of oil and water, comprising: dispersing a pigmentary material in a particle size range of less than about one micron in an aqueous suspension, the aqueous phase of which contains at least 50% by weight of water, and not more than 50% by weight of a volatile liquid completely miscible in water, adding a surface-active agent exhibiting attraction towards said individual liquid selected from the group consisting of oil and water, stirring and thereby coating at least a part of the surface of the individual pigment particles with said agent, freezing the aqueous dispersion of the pigment to solid form, and subliming the aqueous suspending medium.

6. The method of claim 5 in which the pigment is titanium dioxide.

7. A method of preparing a pigment, the individual ultimates of which are substantially free from aggregation and tendency to flocculate and which is readily dispersible by stirring in an individual liquid selected from the group consisting of oil and water, comprising: dispersing a pigmentary material in a particle size range of less than about one micron, in an aqueous suspension, adding a surface-active agent exhibiting attraction towards said individual liquid selected from the group consisting of oil and water, stirring and thereby coating at least a part of the surface of the individual pigment particles with said agent, freezing the aqueous dispersion of the pigment to solid form, and subliming the aqueous suspending medium.

8. A method of preparing a pigment, the individual ultimates of which are substantially free from aggregation and tendency to flocculate and which is readily dispersible by stirring in water, comprising: dispersing a pigmentary material in a particle size range of less than about one micron in an aqueous suspension, the aqueous phase of which contains at least 50% by weight of water, and not more than 50% by weight of a volatile liquid completely miscible in water, adding a surface-active agent exhibiting attraction towards water, stirring and thereby coating at least a part of the surface of the individual pigment particles with said agent, freezing the aqueous dispersion of the pigment, to solid form, and subliming the aqueous suspending medium.

9. A method of preparing a pigment, the individual ultimates of which are substantially free from aggregation and tendency to flocculate and which is readily dispersible by stirring in oil, comprising: dispersing a pigmentary material in a particle size range of less than about one micron in an aqueous suspension, the aqueous phase of which contains at least 50% by weight of water, and not more than 50% by weight of a volatile liquid completely miscible in water, adding a surface-active agent exhibiting attraction towards oil, stirring and thereby coating at least a part of the surface of the individual pigment particles with said agent, freezing the aqueous dispersion of the pigment, to solid form, and subliming the aqueous suspending medium.

10. A method of preparing a pigment, the individual ultimates of which are substantially free from aggregation and tendency to flocculate and which is readily dispersible by stirring in an individual liquid selected from the group consisting of oil and water, comprising: dispersing a pigmentary material in a particle size range of less than about 1.0 micron in an aqueous suspension, freezing the aqueous dispersion of the pigment to solid form, and subliming the aqueous suspending medium.

11. A method of preparing a pigment, the individual ultimates of which are substantially free from aggregation and tendency to flocculate and which is readily dispersible by stirring in water, comprising: dispersing a pigmentary material in a particle size range of less than about 1.0 micron in an aqueous suspension, the aqueous phase of which contains at least 50% by weight of water, and not more than 50% by weight of a volatile liquid completely miscible in water, freezing the aqueous dispersion of the pigment, to solid form, and subliming the aqueous suspending medium.

12. A method of preparing a pigment, the individual ultimates of which are substantially free from aggregation and tendency to flocculate and which is readily dispersible by stirring in oil, comprising: dispersing a pigmentary material in a particle size range of less than about 1.0 micron in an aqueous suspension, the aqueous phase of which contains at least 50% by weight of water, and not more than 50% by weight of a volatile liquid completely miscible in water, freezing the aqueous dispersion of the pigment, to solid form, and subliming the aqueous suspending medium.

13. A readily dispersible pigment, which is dispersible by stirring in an individual liquid selected from the group consisting of oil and water comprising a pigmentary material having a particle size range of less than 1.0 micron, at least a part of the surface of the particles of which are coated with a surface-active agent, prepared by the method of claim 7.

14. A readily dispersible pigment, which is dispersible by stirring, comprising particles of an average size of less than 0.5 micron of a phthalocyanine selected from the group consisting of copper phthalocyanine, unmetallized phthalocyanine, cobalt phthalocyanine, tin phthalocyanine, zinc phthalocyanine, and halogen, sulfonic, imidomethyl, and phthalimido derivatives thereof, produced by the process of claim 15.

15. A method of preparing a phthalocyanine, oil-dispersible, stir-in pigment comprising: dispersing a phthalocyanine selected from the group consisting of copper phthalocyanine, unmetallized phthalocyanine, cobalt phthalocyanine, tin phthalocyanine, zinc phthalocyanine, and halogen, sulfonic, imidomethyl, and phthalimido derivatives thereof, in water, in pigmentary form having the average particle size of less than about 0.5 micron, adding a solution of a surface-active agent selected from the group consisting of the free acids of abietic acid, naphthenic acid, rosin acid, and fatty acid having from 12 to 24 carbon atoms, and salts of said acids with the cations of sodium, potassium, lithium, and ammonia, then adding, with agitation, a soluble heavy metal salt selected from the group consisting of the soluble salts of calcium, strontium, magnesium, aluminum, and barium, thereby forming an insoluble heavy metal surface-active acid salt on the surface of the individual pigment particles, freezing the pigment dispersion to solid form, and subliming the water from the pigment particles.

References Cited in the file of this patent

UNITED STATES PATENTS

| | | |
|---|---|---|
| 2,003,640 | Wunsch | June 4, 1935 |
| 2,062,159 | Brizzolara et al. | Nov. 24, 1936 |
| 2,166,074 | Reichel | July 11, 1939 |
| 2,236,296 | Minich et al. | Mar. 25, 1941 |
| 2,242,320 | New | May 20, 1941 |
| 2,649,388 | Wills et al. | Aug. 18, 1953 |
| 2,891,964 | Roberts | June 23, 1959 |
| 2,915,475 | Bugosh | Dec. 1, 1959 |